March 22, 1938. G. Y. COURTNEY 2,112,145
HOT JET APPARATUS
Filed Aug. 14, 1936

Gilbert Y. Courtney
INVENTOR
BY Victor J. Evans & Co.
ATTORNEYS

Patented Mar. 22, 1938

2,112,145

UNITED STATES PATENT OFFICE 2,112,145

HOT JET APPARATUS

Gilbert Y. Courtney, Detroit, Mich.

Application August 14, 1936, Serial No. 96,113

1 Claim. (Cl. 128—229)

This invention relates to hot jet apparatus and has for an object to provide apparatus for applying a controlled jet of a heat medium, such as hot water, to bacteria infected parts, the jet being of much higher temperature than ordinarily can be withstood whereby bacteria will be effectively destroyed without injury to the tissues of the patient.

It has long been known that heat will destroy bacteria. Cauterization by a red hot iron was practiced long before the reason for the beneficial effects of cauterization was known. Hot water is just as effective as red hot irons and not so destructive. I have discovered that hot water applied in the form of a fine jet can be endured at a temperature higher than is necessary to kill bacteria and that this jet will destroy objectionable bacteria at or near any surface that can be reached by the jet. I have discovered also that the sudden application of heat by the fine water jet is more destructive to bacteria than a higher temperature less forcibly applied.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1:
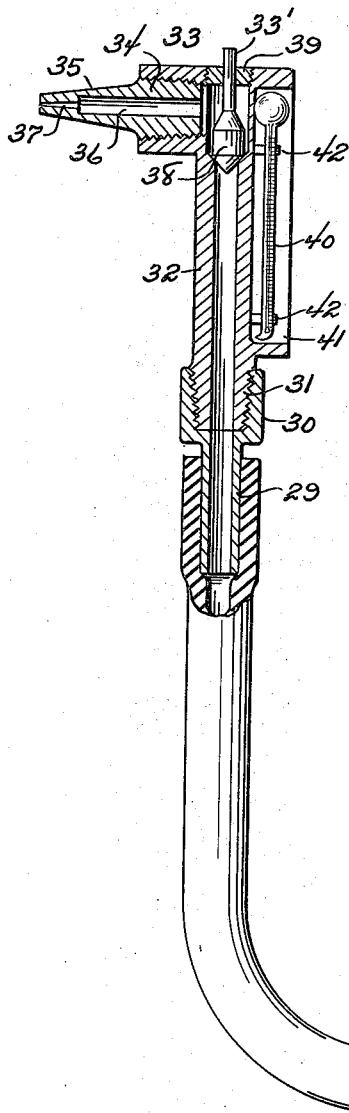
Figure 1 is a longitudinal sectional view, with parts broken away, of a hot jet apparatus constructed in accordance with the invention.
Figure 1:
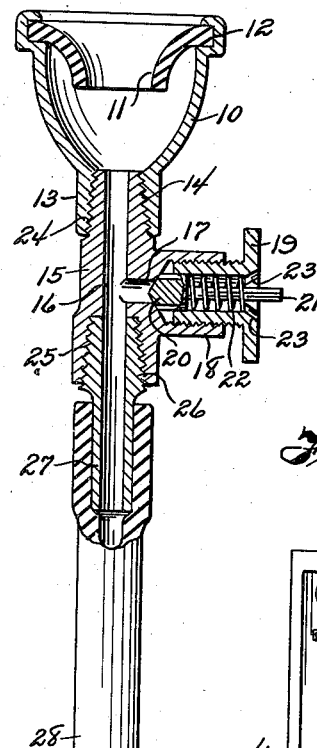

Referring now to the drawing in which like characters of reference designate similar parts in the various views, 10 designates a socket member having a flared rubber washer 11 confined in the outer edge in a groove 12 and adapted to support a hose through which hot water may be supplied to the apparatus. The member is provided with a tubular extension 13 having a tapered screw threaded bore 14.

The pressure regulator 15 is attached to the socket member, the same being substantially a T-coupling having a longitudinal bore 16 and having a transverse bore 17 in the lateral branch 18. A hollow flanged nut 19 is threaded into the lateral branch. A plunger valve 20 is seated in the bore 17 and is provided with a stem 21 which extends through the bore of the nut. A helical spring 22 is sleeved on the stem and confined under tension between the valve and the flange of the nut. Flow openings 23 are formed in the flange of the nut to release pressure. By adjusting the nut tension on the spring is adjusted to control the valve 20.

The body of the pressure regulator is provided at one end with an externally threaded tapered nipple 24 adapted to be screwed into the tubular extension 13 of the socket member 10. The opposite end of the body is provided with an internal tapered screw thread 25 to receive the tapered plug end 26 of a tube 27 to which one end of a hose 28 may be attached.

The opposite end of the hose 28 is secured to a tube 29 having an integral socket member 30 which is provided with an internal tapered screw thread 31 to receive a hand piece 32. The hand piece 32 comprises a substantially L-shaped body, the lateral branch 33 of which is provided with an internal tapered screw thread to receive the threaded plug end 34 of a jet nozzle 35. The bore 36 of the jet nozzle is substantially uniform in diameter and terminates in a conical extremity 37 which produces a needle jet when fluid under high temperature is forced through the apparatus. A plug valve 38 is mounted in the longitudinal bore of the hand piece 32 and is provided with a finger operated stem 38' which is slidably fitted in a plug 39 which is threaded into the end of the bore of the hand piece.

Figure 2:
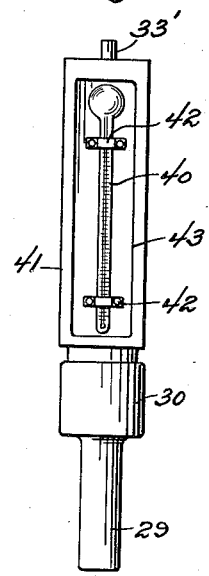
Figure 2 is an end elevation of the hand piece.

A thermometer 40 is mounted in a casing 41 by means of brackets 42. The casing is integral with the rear side of the hand piece and is open at the front as shown at 43 in Figure 2, to expose the thermometer.

In operation hot water may be supplied under pressure through a hose connected to any suitable hot water supply, the valve 20 being initially adjusted to maintain a predetermined pressure, excess pressure escaping through the openings 23 in the flanged nut 19. The operator directs the needle jet of hot water issuing from the nozzle 35 direct against the bacteria infected parts. In practice it is found that the force of the jet, coacting with the high temperature of the water, effectively destroys all objectionable bacteria at or near the surface reached by the fine hot jet.

From the above description it is thought that the construction and operation of the invention will be fully understood without further explanation.

What is claimed is:

A device for applying to infected tissues a needle jet of liquid comprising a valve controlled liquid tube, a hand piece having a substantially L-shaped body secured to the tube, the lateral branch of the body being provided with an internal tapered screw thread, a jet nozzle having a tapered plug end exteriorly threaded and engaging said screw thread, the bore of the jet nozzle being substantially uniform in diameter and terminating in a conical extremity adapted to produce a needle jet when fluid under high temperature is forced through the nozzle, a plug valve mounted in the longitudinal bore of the hand piece body and having a stem extending transversely of said lateral branch, and a plug threaded into the end of the bore and having an opening slidably receiving said stem and permitting the stem to project exteriorly of the hand piece.

GILBERT Y. COURTNEY.